(12) United States Patent
Luh (10) Patent No.: US 6,786,108 B2
(45) Date of Patent: Sep. 7, 2004

(54) GEAR LEVER CLUTCHING STRUCTURE FOR PREVENTION OF GEAR SLIP

(75) Inventor: Tai-Yang Luh, Taichung Hsien (TW)

(73) Assignee: Taiwan Power Industrial Co., Ltd., Taichung Hsien (TW)

( * ) Notice: Subject to any disclaimer, the term of this patent is extended or adjusted under 35 U.S.C. 154(b) by 164 days.

(21) Appl. No.: 10/217,290

(22) Filed: Aug. 12, 2002

(65) Prior Publication Data

US 2004/0025616 A1 Feb. 12, 2004

(51) Int. Cl.$^7$ ................................................ B60K 20/02
(52) U.S. Cl. ................ 74/473.33; 74/743.1; 74/473.21
(58) Field of Search ..................... 74/473.3, 469, 74/473.1, 473.21, 473.22, 473.24, 473.25, 473.33

(56) References Cited

U.S. PATENT DOCUMENTS

| | | | | |
|---|---|---|---|---|
| 3,082,639 A | * | 3/1963 | Almquist Jr. | ............ 74/473.33 |
| 5,662,079 A | * | 9/1997 | Snider | ................... 123/188.14 |
| 5,689,996 A | * | 11/1997 | Ersoy | .......................... 74/335 |
| 5,845,535 A | * | 12/1998 | Wakabayashi et al. | ... 74/473.18 |
| 5,862,708 A | * | 1/1999 | Shamoto | .................. 74/473.18 |
| 5,913,935 A | * | 6/1999 | Anderson et al. | ............. 74/335 |
| 6,148,686 A | * | 11/2000 | Kataumi | .................. 74/473.18 |

* cited by examiner

Primary Examiner—David A. Bucci
Assistant Examiner—Julie K. Smith (57) ABSTRACT

A motorized beach vehicle has a gear lever clutching structure for prevention of gear slip. The gear lever, the linking arm and the swing arm are connected to form a substantially "h"-shaped structure. The gear lever may be pivoted to combine the combination stud of the swing arm with the combination hole of the combination arm, so that the gear lever may be moved to shift the universal connector of the crank so as to change the speed. After the gear lever accomplishes the gear shifting work, the combination stud is detached from the combination hole of the combination arm. Thus, the crank cannot be moved to shift gear in the gearbox due to vibration or shock applied on the vehicle body, thereby preventing from incurring gear slip of the gearbox of the motorized beach vehicle.

8 Claims, 11 Drawing Sheets

GEAR LEVER CLUTCHING STRUCTURE FOR PREVENTION OF GEAR SLIP

BACKGROUND OF THE INVENTION

1. Field of the Invention

The present invention relates to a gear lever clutching structure for a motorized beach vehicle, and more particularly to a clutching structure mounted between the gear lever and the universal connector of the crank, for prevention of gear slip of the gearbox of the motorized beach vehicle.

2. Description of the Related Art

Figure 1:
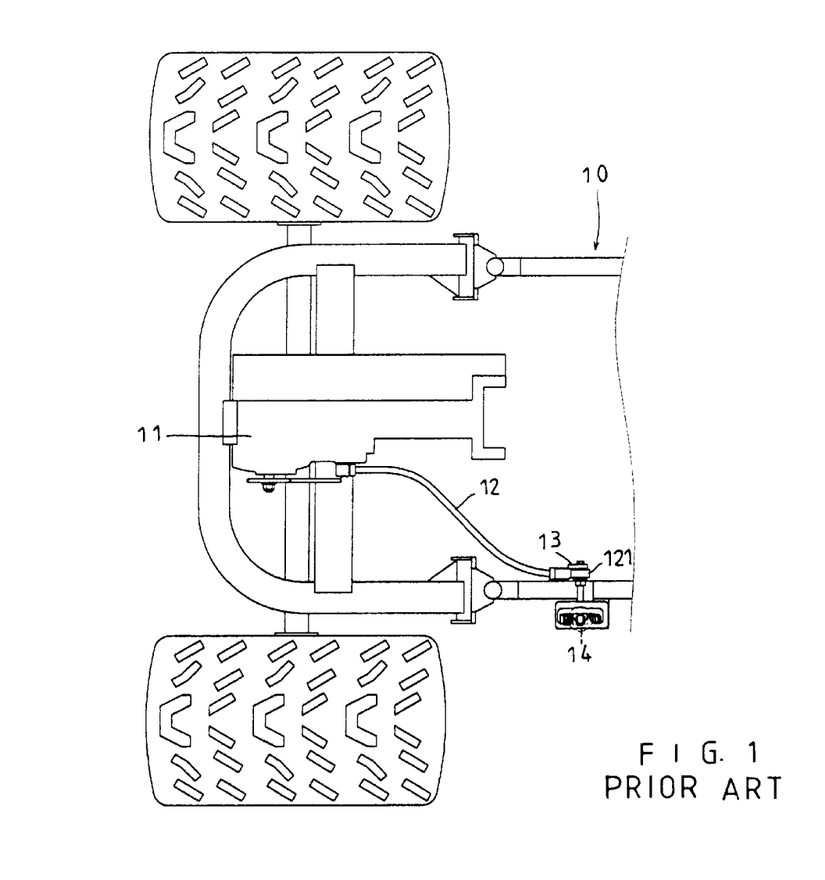
FIG. 1 is a partially cut-away top plan view of a conventional motorized beach vehicle in accordance with the prior art.
Figure 2:
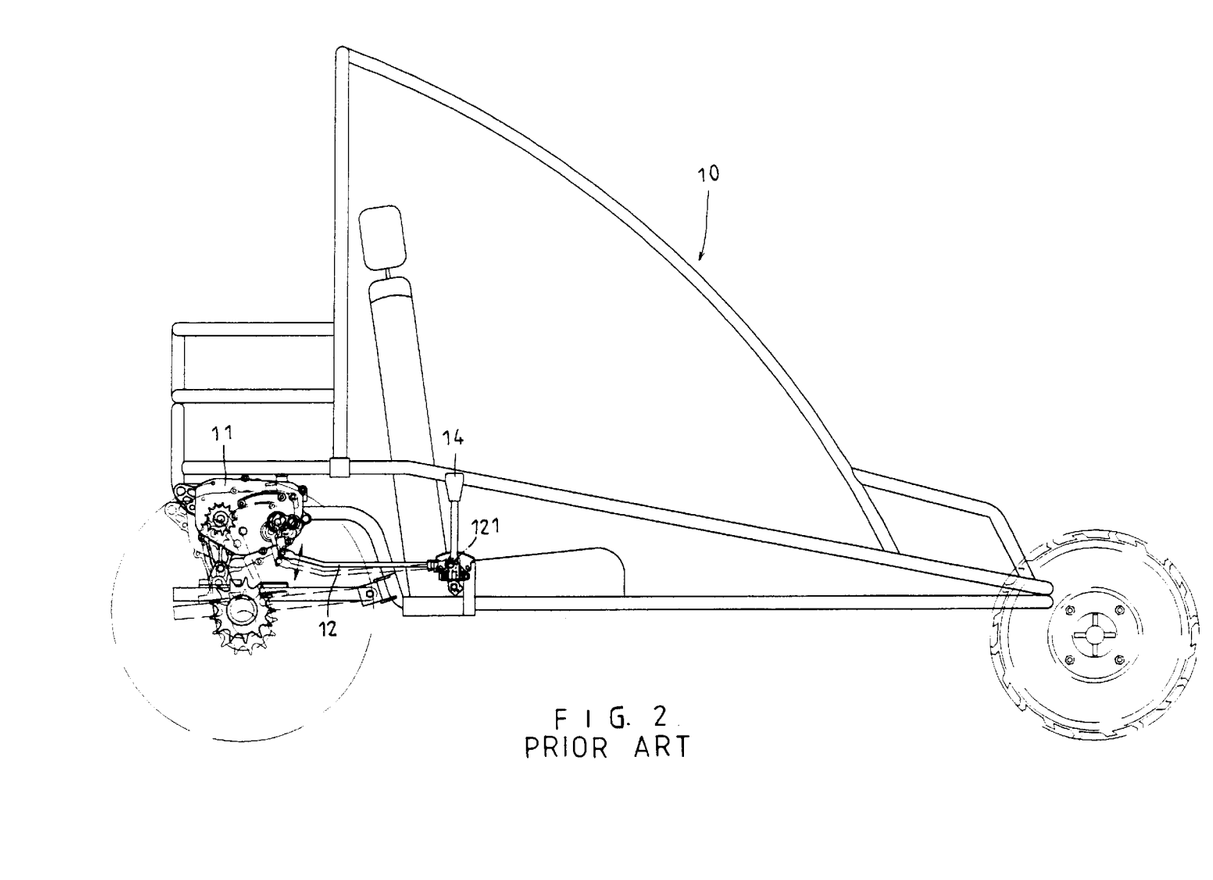
FIG. 2 is a side plan view of the conventional motorized beach vehicle in accordance with the prior art.
Figure 3:
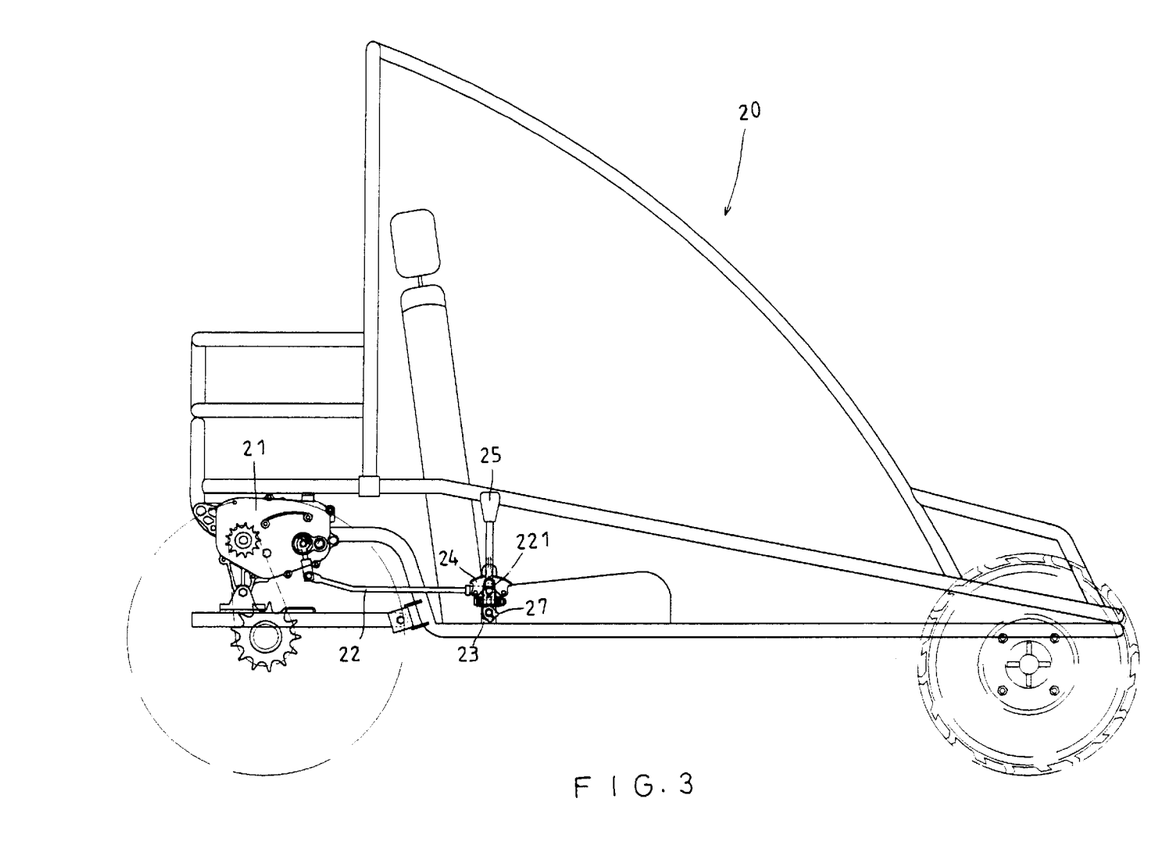
FIG. 3 is a side plan view of a motorized beach vehicle in accordance with a preferred embodiment of the present invention.
Figure 4:
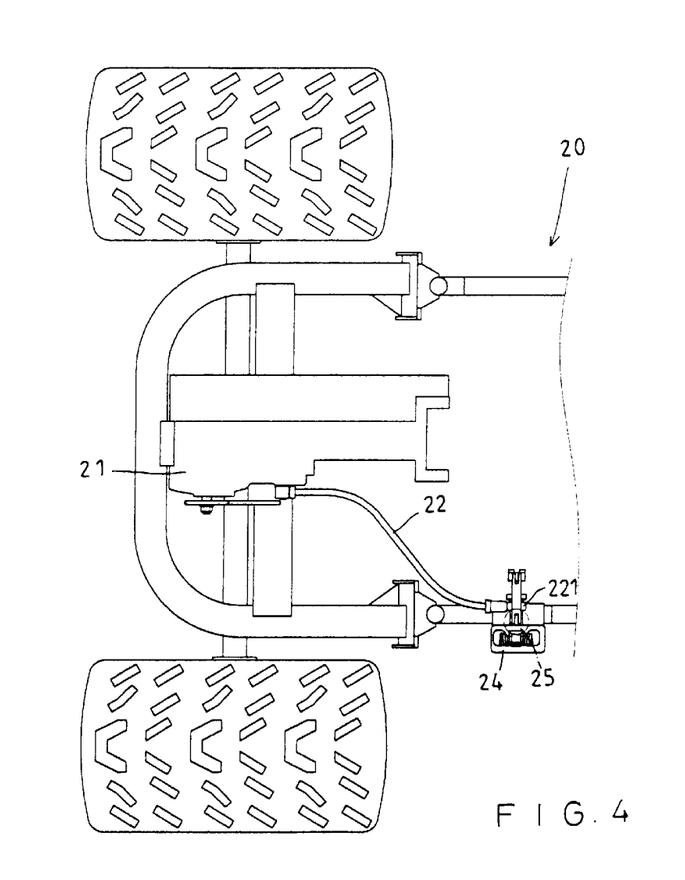
FIG. 4 is a partially cut-away top plan view of the motorized beach vehicle in accordance with the preferred embodiment of the present invention.

A conventional motorized beach vehicle 10 in accordance with the prior art shown in FIGS. 1 and 2 comprises a gearbox 11 controlled by a crank 12 which has one end provided with a universal connector 121 which is connected to a swing arm 13 which is driven by a gear lever 14, so that the crank 12 may be moved to shift gear. However, the conventional motorized beach vehicle 10 is not provided with a clutching structure for prevention of gear slip of the gear lever 14. Thus, when the conventional motorized beach vehicle 10 is driven on a rugged road, the crank 12 is easily moved by vibration caused by the rugged road so as to drive the gearbox 11 to shift gear unintentionally, thereby causing inconvenience to the driver.

SUMMARY OF THE INVENTION

The present invention has arisen to mitigate and/or obviate the disadvantage of the conventional motorized beach vehicle.

The primary objective of the present invention is to provide a clutching structure mounted between the gear lever and the universal connector of the crank, for prevention of gear slip of the gearbox of the motorized beach vehicle.

In operation, the gear lever may be combined with the universal connector of the crank by the clutching structure, so that the universal connector of the crank may be shifted by the gear lever to proceed the gear shifting work in the gearbox. After the gear shifting work is accomplished, the gear lever is disengaged from the universal connector of the crank by the restoring force of the torsion spring of the clutching structure, so that the crank cannot be moved to shift gear in the gearbox due to vibration or shock applied on the vehicle body, thereby preventing from incurring gear slip of the gearbox of the motorized beach vehicle.

In accordance with the present invention, there is provided a motorized beach vehicle having a gear lever clutching structure for prevention of gear slip, comprising: a gearbox controlled by a crank which has one end provided with a universal connector which is controlled by movement of a gear lever, wherein:

the gear lever has a distal end provided with a pivot portion pivotally mounted on a pivot portion of a shaft seat, a torsion spring is mounted between the gear lever and the shaft seat, so that the gear lever is positioned in one of multiple gear retaining slots of a catch board, a shaft is extended through a shaft tube of a bracket, and has one end secured in an axial hole of the shaft seat, so that when the gear lever is moved, the shaft is rotated by movement of the gear lever, the gear lever is pivotally connected with a linking arm, the shaft is pivotally connected with a swing arm, the linking arm is pivotally connected with the swing arm, so that the gear lever, the linking arm and the swing arm are connected to form a substantially "h"-shaped structure, a combination arm has a lower portion mounted on the shaft, a mediate portion locked with the universal connector of the crank, and an upper portion formed with a combination hole, the swing arm is provided with a combination stud that may be inserted into the combination hole of the combination arm when the swing arm is pivoted toward the combination arm;

the gear lever may be pivoted toward the swing arm by an elastic force of the torsion spring to be positioned in one of the multiple gear retaining slots of the catch board, so that the swing arm is pivoted outward relative to the combination arm, thereby detaching the combination stud from the combination hole of the combination arm; and the gear lever may be pivoted outward relative to the swing arm to overcome the elastic force of the torsion spring, so that the swing arm is pivoted toward the combination arm, thereby inserting the combination stud into the combination hole of the combination arm, so that the combination arm may be combined with and moved by the swing arm to shift the universal connector of the crank, so that the crank may be shifted to shift gear in the gearbox, so as to change a speed.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 3–8, a motorized beach vehicle 20 in accordance with a preferred embodiment of the present invention comprises a gear lever clutching structure for prevention of gear slip.

The motorized beach vehicle 20 comprises a gearbox 21 controlled by a crank 22 which has one end provided with a universal connector 221. The motorized beach vehicle 20 is provided with a U-shaped bracket 23, and a catch board 24. The U-shaped bracket 23 has two side faces 231 and 232, and is provided with a shaft tube 233 which is extended through the two side faces 231 and 232. The catch board 24 is locked on the side face 231 of the U-shaped bracket 23, and is formed with a first gear retaining slot 241, a second gear retaining slot 242, and a third gear retaining slot 243 for passage of a gear lever 25.

Figure 5:
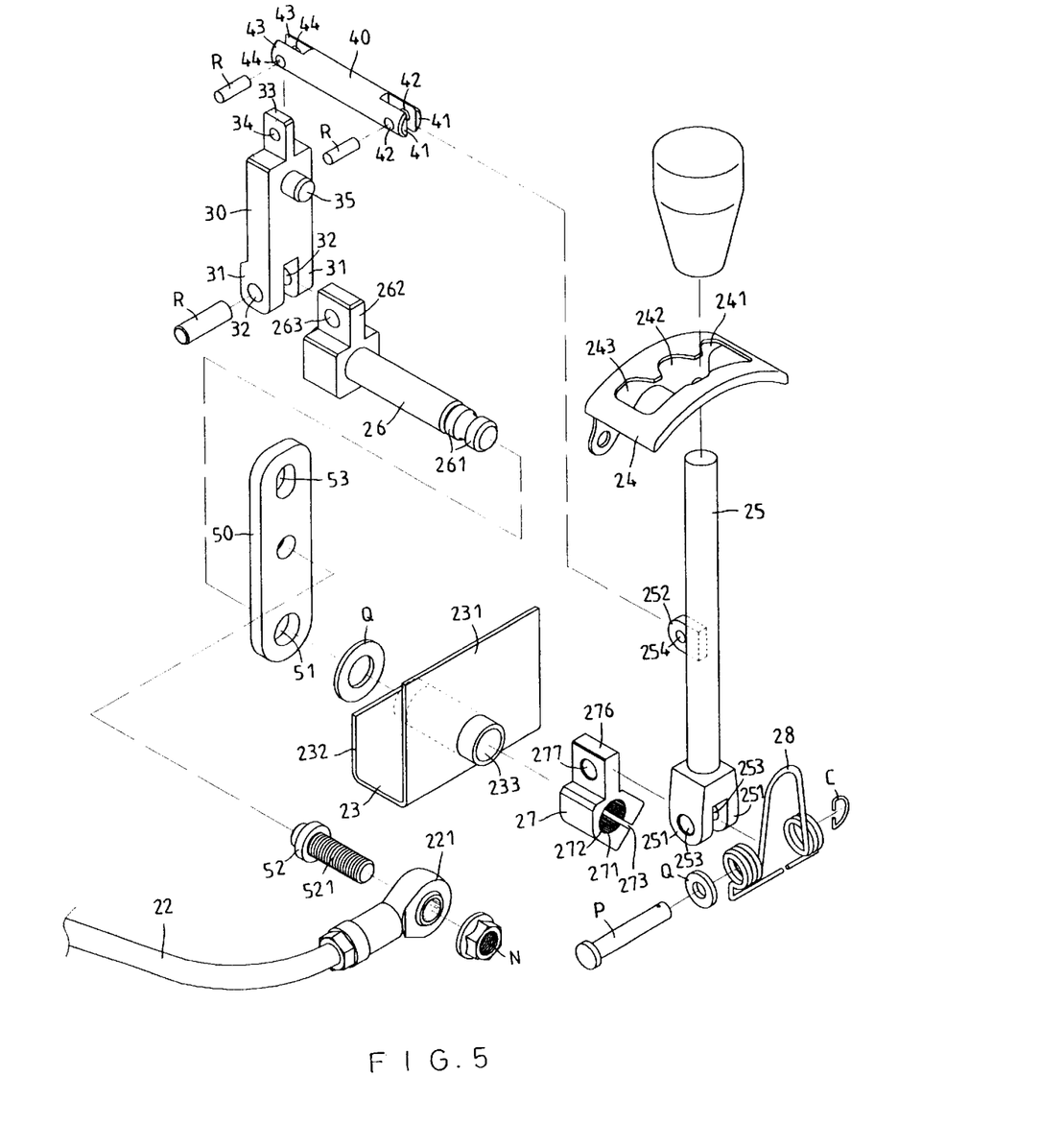
FIG. 5 is an exploded perspective view of a gear lever clutching structure for prevention of gear slip of the motorized beach vehicle in accordance with the preferred embodiment of the present invention.

A shaft 26 is extended through the shaft tube 233, and has a first end provided with an outer tooth 261 to combine with a shaft seat 27, and a second end provided with a pivot portion 262 which is formed with a pivot hole 263. A swing arm 30 has a lower portion provided with a forked first pivot portion 31 which is pivotally mounted on the pivot portion 262 of the shaft 26 and is formed with a first pivot hole 32. A pivot pin "R" is in turn extended through the first pivot hole 32 of the first pivot portion 31 of the swing arm 30 and through the pivot hole 263 of the pivot portion 262 of the shaft 26, so that the first pivot portion 31 of the swing arm 30 is pivotally mounted on the pivot portion 262 of the shaft 26.

The shaft seat 27 is formed with an axial hole 271 for passage of the first end of the shaft 26. The axial hole 271 of the shaft seat 27 is provided with an inner tooth 272 engaged with the outer tooth 261 of the first end of the shaft 26, so that the shaft seat 27 is fixed on the first end of the shaft 26. The axial hole 271 of the shaft seat 27 is formed with a slit 273. The slit 273 is formed with a radial hole (not shown) and a screw bore (not shown) for passage of a bolt (not shown), so that the axial hole 271 of the shaft seat 27 may be closed by rotating the bolt, and the inner tooth 272 of the shaft seat 27 may be closely engaged with the outer tooth 261 of the first end of the shaft 26.

The shaft seat 27 has an upper portion provided with a pivot portion 276 which is formed with a pivot hole 277. The gear lever 25 is pivotally mounted on the shaft seat 27, and has a lower portion passed through the catch board 24 and provided with a forked first pivot portion 251 which is pivotally mounted on the pivot portion 276 of the shaft seat 27 and is formed with a first pivot hole 253. A pivot pin "P" is in turn extended through a washer "Q", a torsion spring 28, the first pivot hole 253 of the first pivot portion 251 of the gear lever 25 and the pivot hole 277 of the pivot portion 276 of the shaft seat 27, and is secured by a C-shaped snap ring "C", so that the first pivot portion 251 of the gear lever 25 is pivotally mounted on the pivot portion 276 of the shaft seat 27. Thus, the gear lever 25 may be deflected toward the swing arm 30 by the elastic force of the torsion spring 28.

The gear lever 25 has a mediate portion provided with a second pivot portion 252 which is formed with a second pivot hole 254. A linking arm 40 has a first end provided with a forked first pivot portion 41 which is pivotally mounted on the second pivot portion 252 of the gear lever 25 and is formed with a first pivot hole 42. A pivot pin "R" is in turn extended through the first pivot hole 42 of the first pivot portion 41 of the linking arm 40 and through the second pivot hole 254 of the second pivot portion 252 of the gear lever 25, so that the first pivot portion 41 of the linking arm 40 is pivotally mounted on the second pivot portion 252 of the gear lever 25.

The swing arm 30 has an upper portion provided with a second pivot portion 33 which is formed with a second pivot hole 34. The linking arm 40 has a second end provided with a forked second pivot portion 43 which is pivotally mounted on the second pivot portion 33 of the swing arm 30 and is formed with a second pivot hole 44. A pivot pin "R" is in turn extended through the second pivot hole 44 of the second pivot portion 43 of the linking arm 40 and through the second pivot hole 34 of the second pivot portion 33 of the swing arm 30, so that the second pivot portion 43 of the linking arm 40 is pivotally mounted on the second pivot portion 33 of the swing arm 30.

Figure 7:
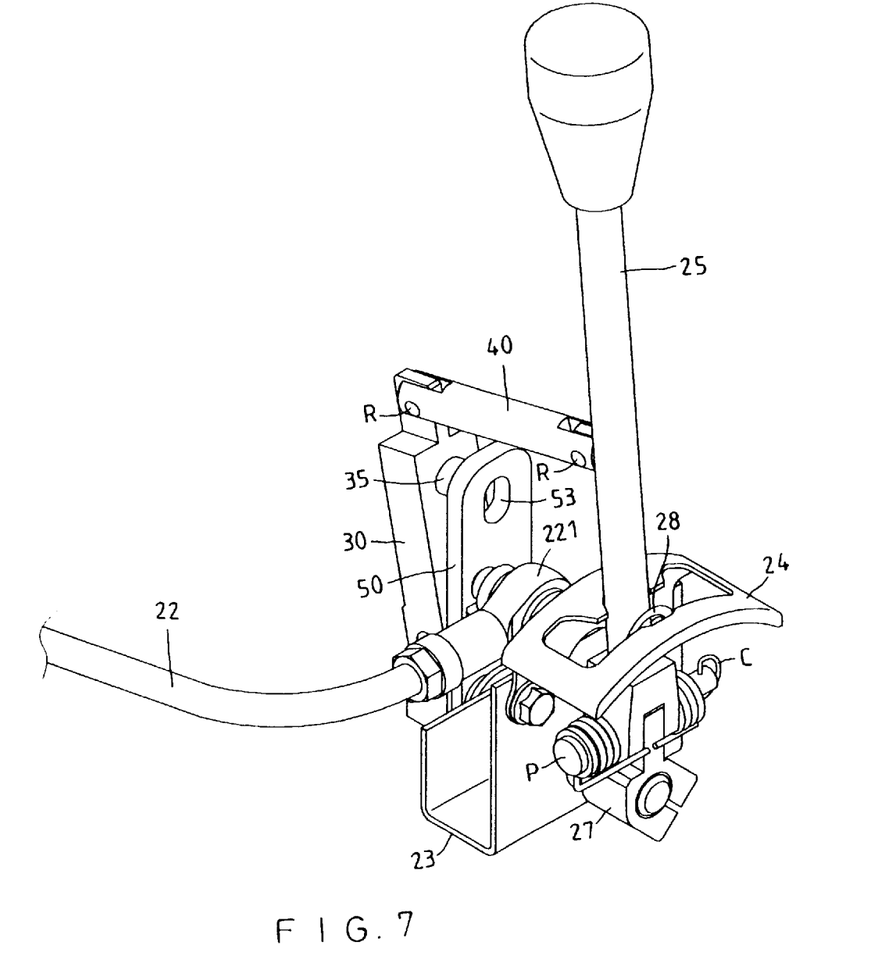
FIG. 7 is a perspective assembly view of the gear lever clutching structure for prevention of gear slip as shown in FIG. 5.

In such a manner, the gear lever 25, the linking arm 40 and the swing arm 30 are connected to form a substantially "h"-shaped structure.

A combination arm 50 has a lower portion mounted on the shaft 26 and formed with a shaft hole 51 for passage of the shaft 26. A washer "Q" is mounted on the shaft 26 and is urged between the combination arm 50 and the shaft tube 233 of the U-shaped bracket 23. The combination arm 50 has a mediate portion locked with the universal connector 221 of the crank 22 by a bolt 52 and a nut "N". the bolt 52 has an outer thread 521 screwed into the nut "N". The combination arm 50 has an upper portion formed with a combination hole 53. The upper portion of the swing arm 30 is provided with a combination stud 35 that may be inserted into the combination hole 53 of the combination arm 50 when the swing arm 30 is pivoted toward the combination arm 50.

Accordingly, the gear lever clutching structure in accordance with the preferred embodiment of the present invention is constructed.

Figure 6:
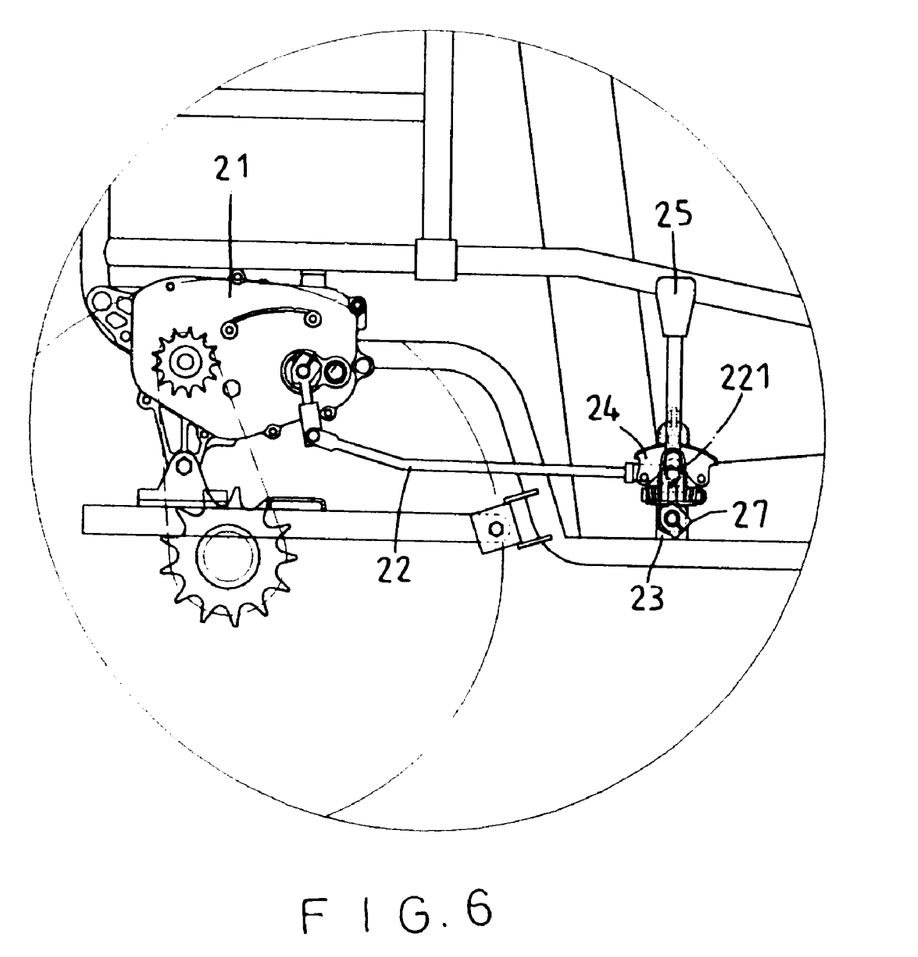
FIG. 6 is a partially enlarged view of the gear lever clutching structure for prevention of gear slip as shown in FIG. 3.
Figure 8:
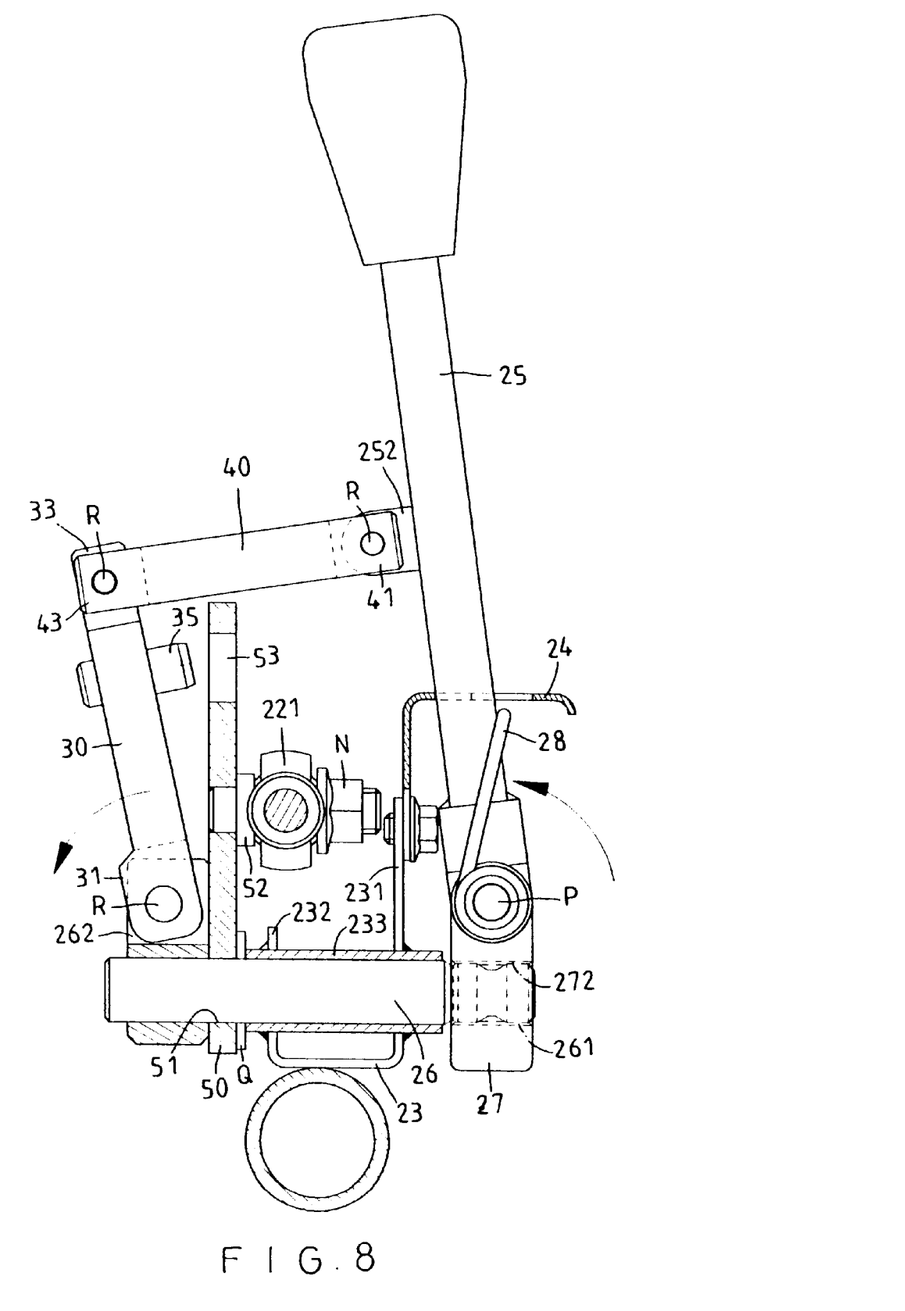
FIG. 8 is a side plan cross-sectional view of the gear lever clutching structure for prevention of gear slip as shown in FIG. 7.

Referring to FIGS. 6–8, before the driver shifts gear, the gear lever 25 may be deflected and pivoted toward the swing arm 30 by the elastic force of the torsion spring 28, so that the swing arm 30 is pivoted outward relative to the combination arm 50, thereby detaching the combination stud 35 from the combination hole 53 of the combination arm 50 as shown in FIG. 8.

Figure 9:
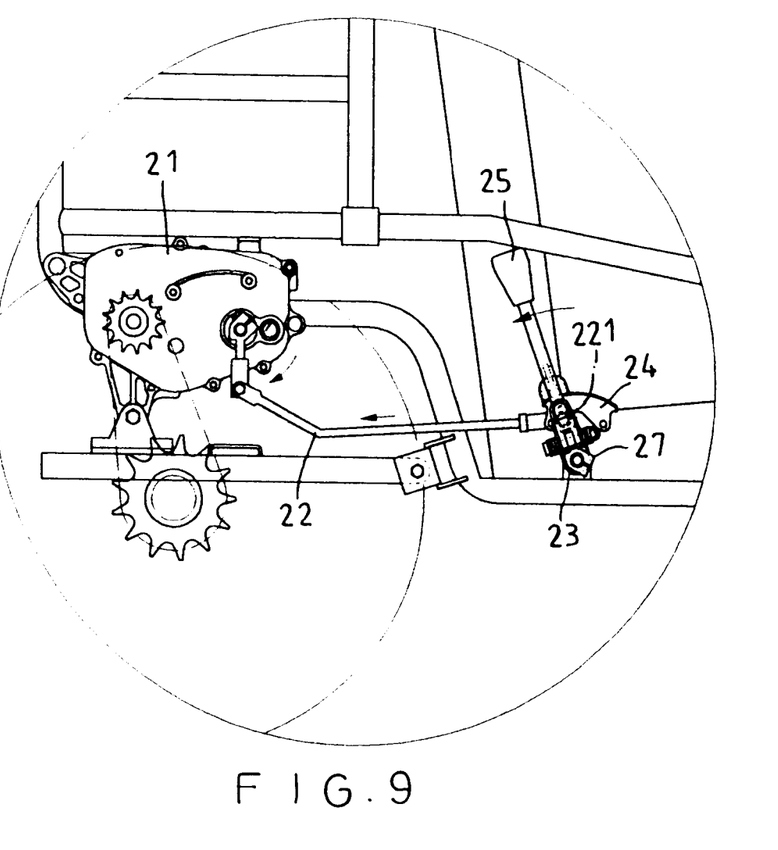
FIG. 9 is a schematic operational view of the gear lever clutching structure for prevention of gear slip as shown in FIG. 6 in use.
Figure 10:
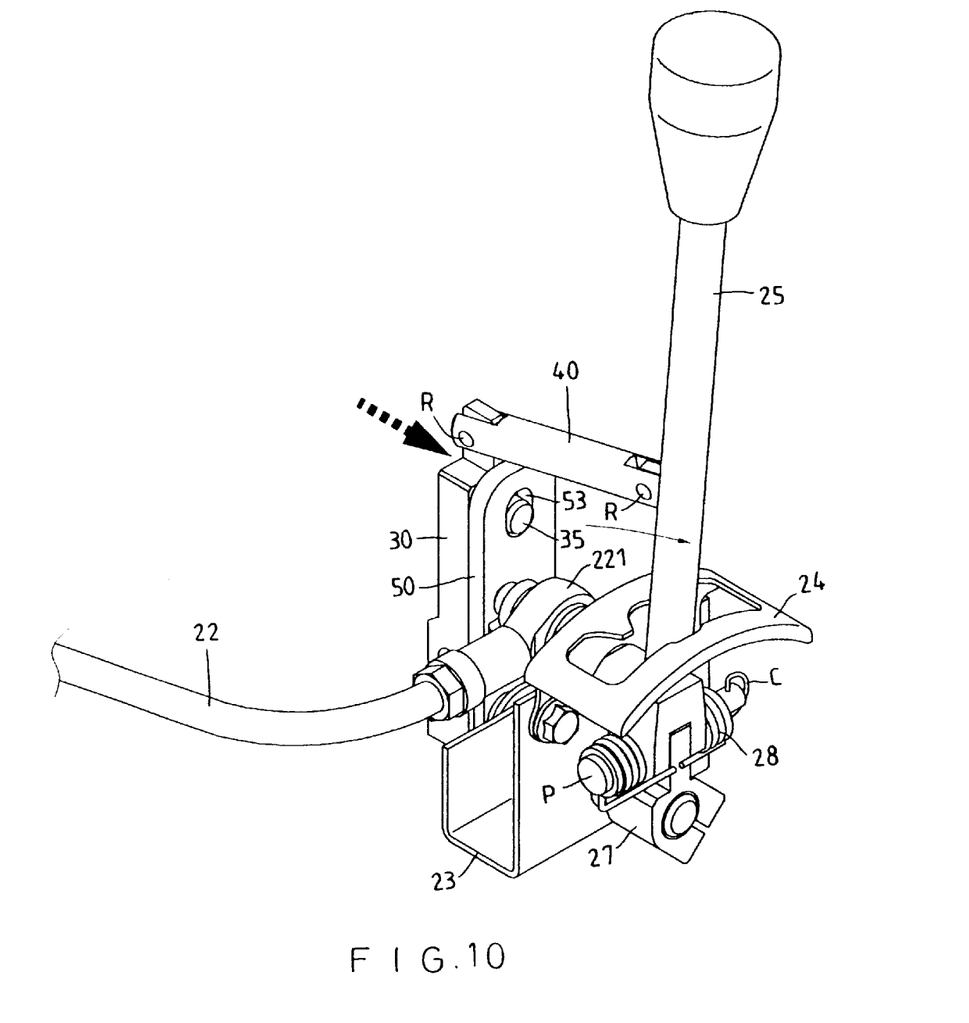
FIG. 10 is a schematic operational view of the gear lever clutching structure for prevention of gear slip as shown in FIG. 7 in use.
Figure 11:
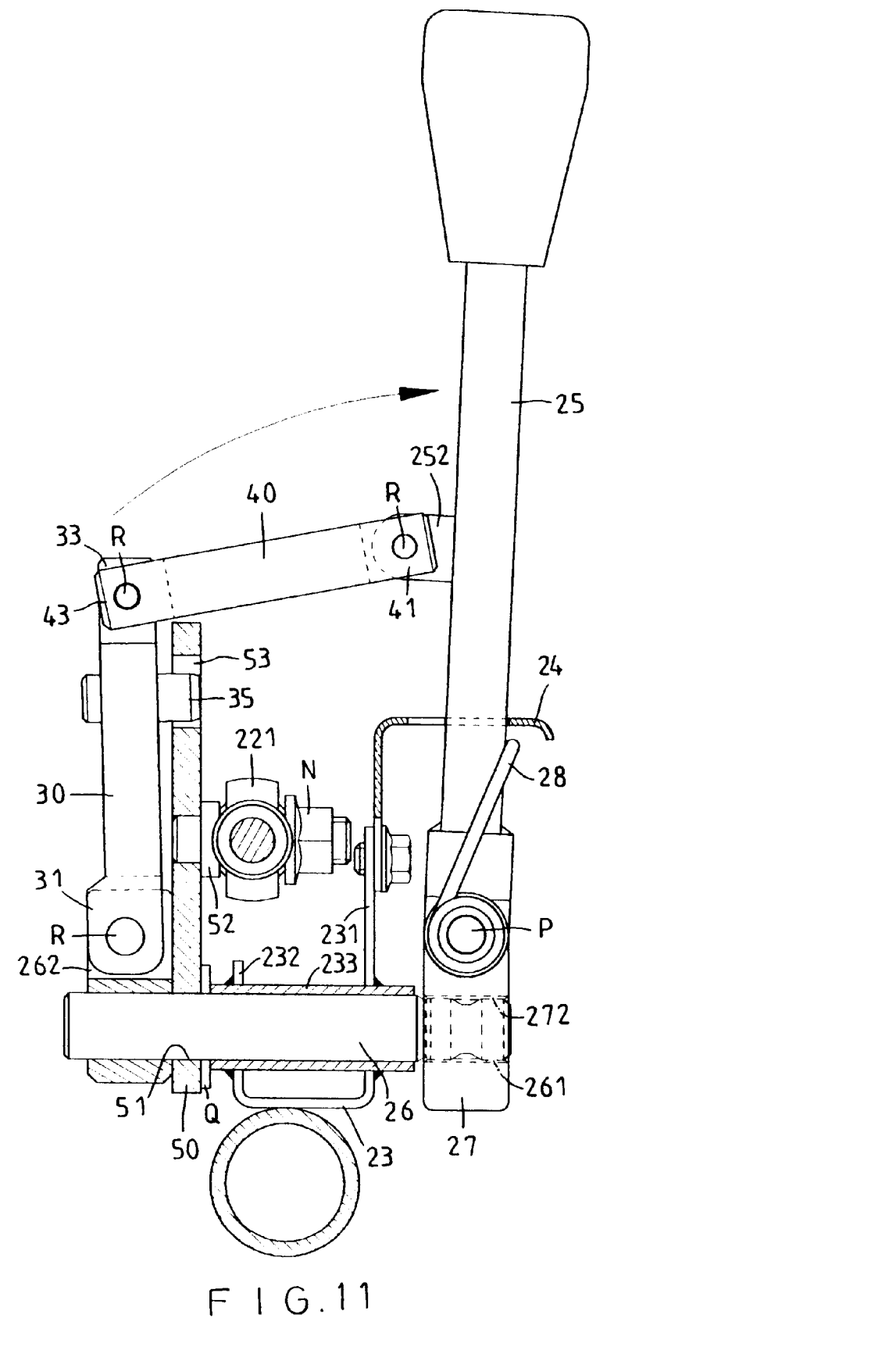
FIG. 11 is a schematic operational view of the gear lever clutching structure for prevention of gear slip as shown in FIG. 8 in use.

Referring to FIGS. 9–11, when the driver shifts gear to change the speed, the gear lever 25 may be pivoted outward relative to the swing arm 30 to overcome the elastic force of the torsion spring 28, so that the swing arm 30 is pivoted toward the combination arm 50, thereby inserting the combination stud 35 into the combination hole 53 of the combination arm 50 as shown in FIG. 11, so that the combination arm 50 may be combined with and moved by the swing arm 30 which may be rotated by the gear lever 25 and the shaft 26.

At this time, the gear lever 25 may be moved in the catch board 24 to rotate the shaft 26, thereby rotating the swing arm 30 which may rotate the combination arm 50 which may be moved to shift the universal connector 221 of the crank 22, so that the crank 22 may be shifted to shift gear in the gearbox 21, so as to change the speed.

After the gear lever 25 accomplishes the gear shifting work, the gear lever 25 may be deflected and pivoted toward the swing arm 30 by the restoring force of the torsion spring 28, so that the swing arm 30 is pivoted outward relative to the combination arm 50, thereby detaching the combination stud 35 from the combination hole 53 of the combination arm 50 as shown in FIG. 8 again.

Thus, the crank 22 cannot be moved to shift gear in the gearbox 21 due to vibration or shock applied on the vehicle body, thereby preventing from incurring gear slip of the gearbox 21 of the motorized beach vehicle 20.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A motorized beach vehicle having a gear lever clutching structure for prevention of gear slip, comprising: a gearbox controlled by a crank which has one end provided with a universal connector which is controlled by movement of a gear lever, wherein:

the gear lever has a distal end provided with a pivot portion pivotally mounted on a pivot portion of a shaft seat, a torsion spring is mounted between the gear lever and the shaft seat, so that the gear lever is positioned in one of multiple gear retaining slots of a catch board, a shaft is extended through a shaft tube of a bracket, and has one end secured in an axial hole of the shaft seat, so that when the gear lever is moved, the shaft is rotated by movement of the gear lever, the gear lever is pivotally connected with a linking arm, the shaft is pivotally connected with a swing arm, the linking arm is pivotally connected with the swing arm, so that the gear lever, the linking arm and the swing arm are connected to form a substantially "h"-shaped structure, a combination arm has a lower portion mounted on the shaft, a mediate portion locked with the universal connector of the crank, and an upper portion formed with a combination hole, the swing arm is provided with a combination stud that may be inserted into the combination hole of the combination arm when the swing arm is pivoted toward the combination arm;

the gear lever may be pivoted toward the swing arm by an elastic force of the torsion spring to be positioned in one of the multiple gear retaining slots of the catch board, so that the swing arm is pivoted outward relative to the combination arm, thereby detaching the combination stud from the combination hole of the combination arm; and the gear lever may be pivoted outward relative to the swing arm to overcome the elastic force of the torsion spring, so that the swing arm is pivoted toward the combination arm, thereby inserting the combination stud into the combination hole of the combination arm, so that the combination arm may be combined with and moved by the swing arm to shift the universal connector of the crank, so that the crank may be shifted to shift gear in the gearbox, so as to change a speed.

2. The gear lever clutching structure for prevention of gear slip in accordance with claim 1, wherein the bracket is U-shaped and has two side faces, the shaft tube is extended through the two side faces of the bracket.

3. The gear lever clutching structure for prevention of gear slip in accordance with claim 2, wherein the catch board is locked on one of the side faces of the U-shaped bracket.

4. The gear lever clutching structure for prevention of gear slip in accordance with claim 1, wherein the shaft is provided with an outer tooth secured in an inner tooth of the axial hole of the shaft seat, so that the shaft seat is fixed on the shaft.

5. The gear lever clutching structure for prevention of gear slip in accordance with claim 1, wherein the axial hole of the shaft seat is formed with a slit.

6. The gear lever clutching structure for prevention of gear slip in accordance with claim 1, wherein the further comprising a pivot pin in turn extended through a washer, the torsion spring, a pivot hole of the pivot portion of the gear lever and a pivot hole of the pivot portion of the shaft seat, and is secured by a C-shaped snap ring, so that the pivot portion of the gear lever is pivotally mounted on the pivot portion of the shaft seat.

7. The gear lever clutching structure for prevention of gear slip in accordance with claim 1, further comprising a washer mounted on the shaft and urged between the combination arm and the shaft tube of the bracket.

8. The gear lever clutching structure for prevention of gear slip in accordance with claim 1, wherein the mediate portion of the combination arm is locked with the universal connector of the crank by a bolt and a nut.

* * * * *